March 7, 1961    S. F. UDSTAD    2,973,722
VEHICLE WITH CENTERING DEVICE
Filed Jan. 24, 1957    3 Sheets-Sheet 1
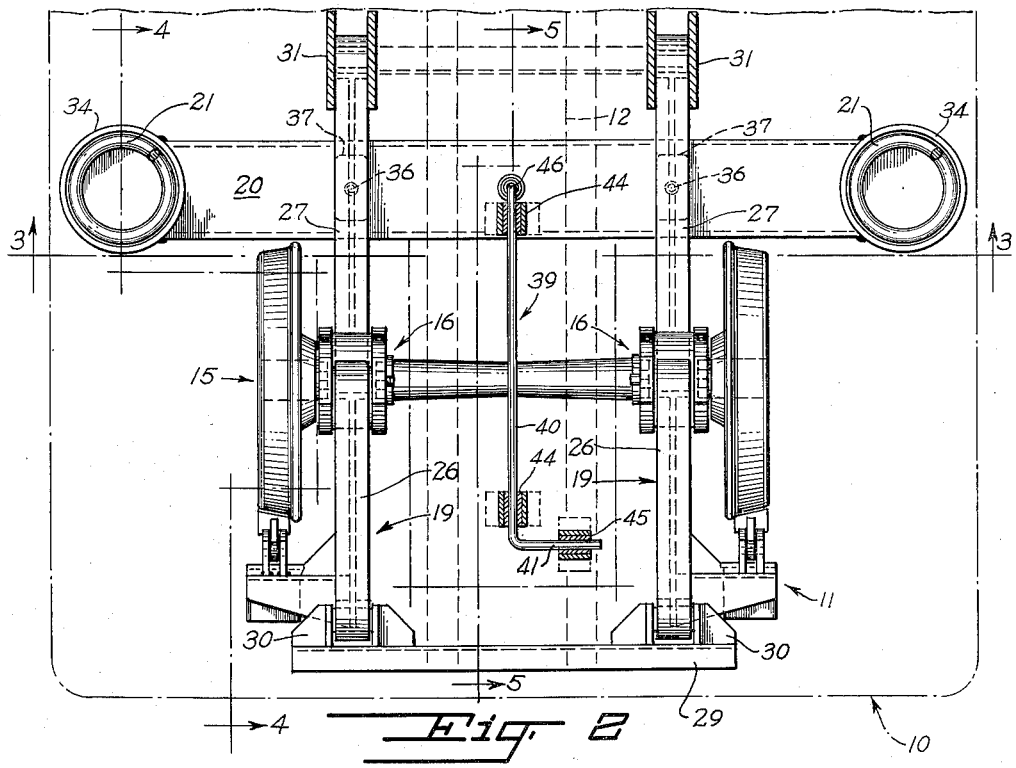
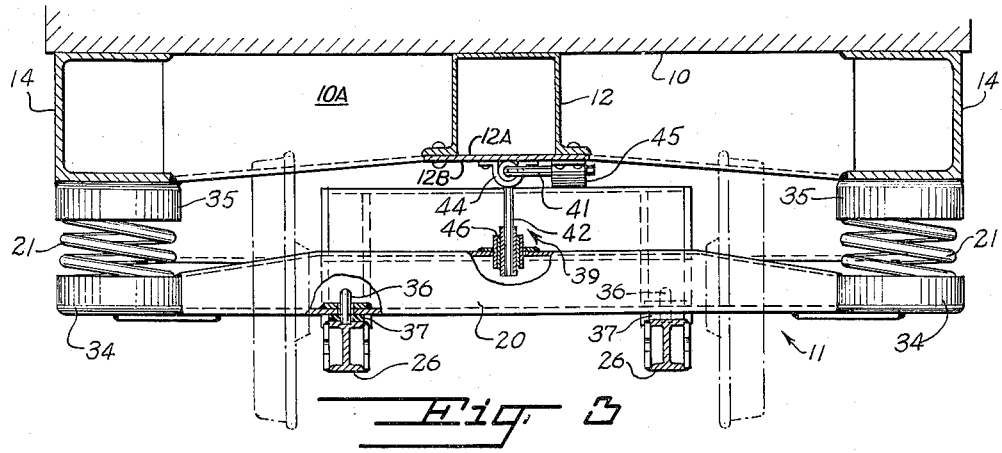
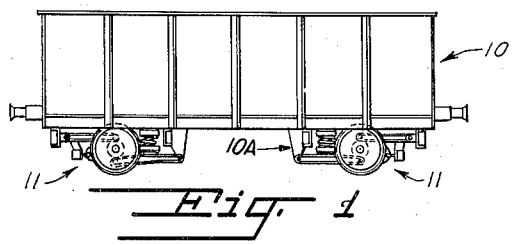
INVENTOR.
Sigvald F. Udstad
BY
Robert A. Shields
Attorney March 7, 1961      S. F. UDSTAD      2,973,722
VEHICLE WITH CENTERING DEVICE Filed Jan. 24, 1957      3 Sheets-Sheet 2

INVENTOR.
Sigvald F. Udstad
BY
Robert A. Shields
Attorney

INVENTOR.
Sigvald F. Udstad
BY
Robert A. Shields
Attorney

United States Patent Office 2,973,722
Patented Mar. 7, 1961

2,973,722

VEHICLE WITH CENTERING DEVICE

Sigvald F. Udstad, Summit, N.J., assignor to ACF Industries Incorporated, New York, N.Y., a corporation of New Jersey Filed Jan. 24, 1957, Ser. No. 636,122

3 Claims. (Cl. 105—171)

This invention relates to vehicles, and, more particularly, to railway vehicles having centering devices for resisting relative lateral displacement of the truck and vehicle body, and for returning them to their normal positions when lateral displacement does occur.

Heretofore, various means have been employed as centering devices, such as opposing rubber pads mounted on the truck or body, or supporting the body from the truck by swing hangers. While such devices as these have met with some commercial success, they have not been entirely satisfactory. The former type of centering device limits relative lateral movement of the body and the truck, but does not always positively center them, so that displacement effected by a lateral shock or by taking a curve, for example, is not corrected until an opposing shock or curve occurs, and then it is often over-corrected. The latter type of centering device is not entirely satisfactory due to its relatively high cost and the unbalancing effects of uneven wear. But, most important of all, it has been found that as the load is varied in the vehicle and the truck springs are placed under varying degrees of compression, lateral shocks are not delivered uniformly to the body, so that while centering devices which are not able to compensate for varying loads may function satisfactorily for one load condition, they do not function satisfactorily for all load conditions. Improper functioning of centering devices contributes to discomfort of passengers and damage to lading.

Accordingly, it is an object of the present invention to provide a railway vehicle with a centering device which is not subject to the foregoing difficulties and disadvantages.

Another object is to provide such a vehicle in which the centering device automatically compensates for varying loads so that the relative displacement between the body and the truck is resisted and corrected by a uniform effort regardless of load conditions.

Another object is to provide such a vehicle wherein the centering device exerts a positive centering effort as well as a resistance to relative displacement due to lateral or turning forces.

A further object is to provide a centering device which is economical to manufacture, simple in construction, reliable in operation, and requires little maintenance.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing in a vehicle incuding a body member and a truck member, the truck member supporting at least a portion of the body member for relative lateral displacement therebetween, a centering device for resisting such relative displacement and correcting the same comprising a torsion rod having one end secured to one of the members against substantial movement in relation thereto and having its other end formed as a crank arm and connected to the other of the members for rotational movement in proportion to the degree of displacement. The end of the centering device which is connected to one of the members for rotational movement serves to torque the device and is slidably connected to the member so as to have an effective length which is variable according to the load conditions of the body member. That is, the end of the centering device which serves as a crank arm is in effect shortened as the body member is loaded and is in effect lengthened as the body member is unloaded. This variation in the effective length of the crank arm is accomplished by connecting the fixed end and body portion of the torsion rod to the car body and connecting the outer end of the crank arm slidably in an unsprung portion of the truck.

A preferred embodiment of the invention has been chosen for purposes of illustration and description, and is shown in the accompanying drawing, forming a part of the specification, wherein:

Fig. 1 is a side elevational view of a car supported on a pair of trucks and provided with centering devices in accordance with the present invention;

Fig. 2 is a top plan view, partly in section, of one of the trucks and the centering device of Fig. 1 and illustrating the body outline in broken lines;

Fig. 3 is a fragmentary sectional view taken along the line 3—3 of Fig. 2;

Figure 4:
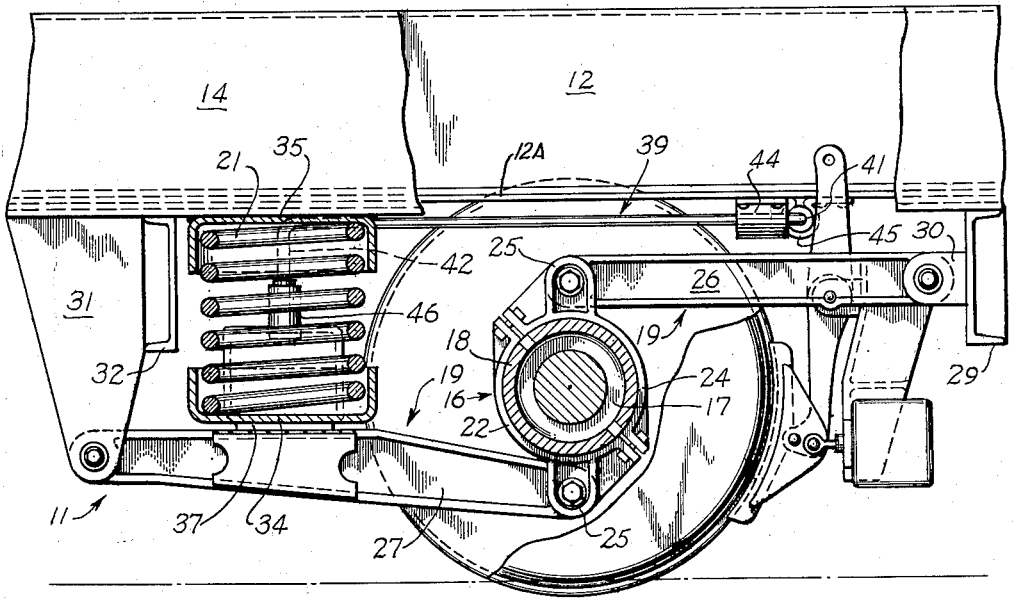
Fig. 4 is a sectional view taken along the line 4—4 of Fig. 2 and illustrating the parts in normal or unloaded condition.

Referring to the drawing in detail, there is shown in Fig. 1 a railway car comprising a body 10 supported on a pair of trucks 11 and constituting a vehicle which has been selected to illustrate the present invention.

As best shown in Figs. 2 and 3, the body 10 is mounted on an underframe 10A which includes a center sill 12 formed of a downwardly opening 12A, flanged C beam with bottom tie plates, and a pair of side sills 14 formed of inwardly opening C beams.

The truck 11, all the parts of which are unsprung and which comprises a single axle wheel and axle assembly 15, a lever 16 supported by a journal bearing 17 for rotary movement adjacent each end of the axle and inboard of the wheels, link means 19 extending longitudinally of the body and pivotally connected to each lever 16 and to the body, and a truck bolster 20 extending transversely of the car and supported by the link means 19. The bolster 20 in turn supports springs 21 upon which the body side sills 14 are carried.

The levers 16 are each essentially a split ring having similar portions 22 and 24, mounted on the journal bearing 17 through a rubber sleeve 18 so that the ring is permitted rotation about the axis of the axle. Each of the portions 22 and 24 is provided with a radial lug 25 so that when they are secured together, as by bolts, the lugs 25 are diametrically opposed. Each lever 16 is so mounted adjacent an axle end as to dispose the lugs 25 in vertical alignment.

Figure 5:
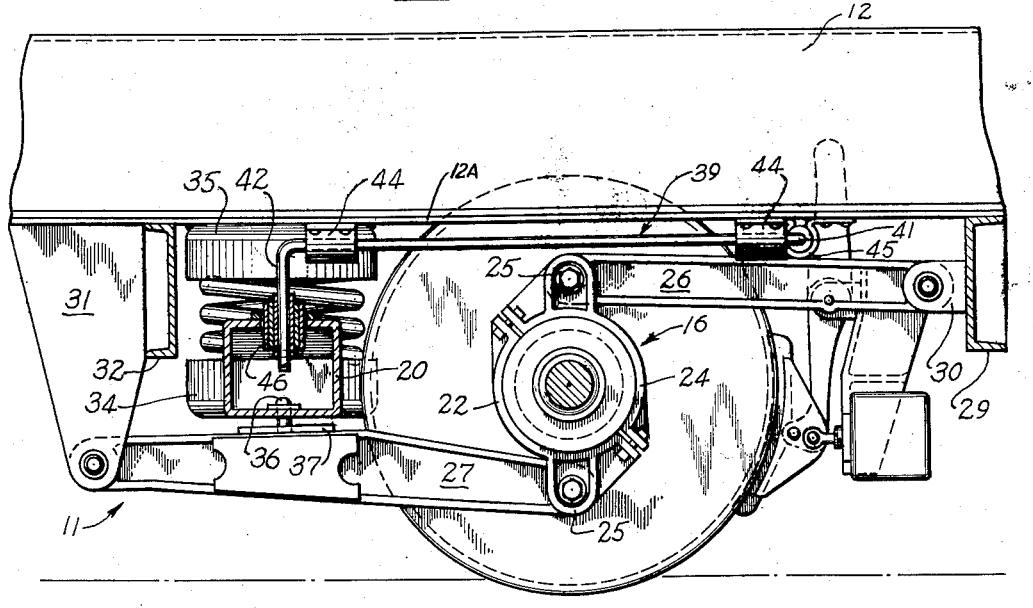
Fig. 5 is a sectional view taken along the line 5—5 of Fig. 2 but showing the parts in their relative positions when the body is loaded.

As best shown in Figs. 2, 4 and 5, the link means 19 includes a rigid, upper link 26 and a similar lower link 27 extending longitudinally with respect to the car at each side of the truck. The upper links 26 are each pivotally connected, at one end thereof, to the upper lug 25 of one of the levers 16, and, at the other end thereof, to a transversely extending cross member 29 which is provided with a suitable bracket 30 for that purpose. The cross member 29 may be a body cross bearer, for example, or is otherwise integrally connected in the underframe structure of the body.

The lower links 27 are each pivotally connected, at one end thereof to the lower lug 25 of one of the levers 16, the lugs 25 normally being in vertical alignment, as stated. The other end of each of the links 27 is pivotally connected to a bracket 31 depending from a cross member 32 of the body 10.

The pivotal connections at each end of each of the links 26 and 27 are made through rubber bushings to permit limited universal movement of these links with respect to the connected parts.

It will be noted that the cross members 29 and 32 are disposed on opposite sides of the wheel and axle assembly so that the links 26 and 27 extend from the lugs 25 in opposite directions.

The bolster 20 is a box beam, as seen in Fig. 5, extending transversely of the car and terminating outboard of the wheels. Upwardly facing spring cups 34 are secured to the bolster ends and serve to seat the helical springs 21, which extend upwardly into downwardly facing cups 35 secured to the side sills 14. The bolster 20 passes over and is supportingly connected to each of the links 27 by upwardly extending pins 36 anchored in the links. A suitable cushion pad 37 may be placed between the bolster and each of the links 27.

The embodiment of the centering device 39 chosen for illustration in connection with the vehicle just described is an elongate rod having a central section 40 and two end sections 41 and 42. The central section 40 is rotatably supported in a pair of rubber bushed brackets 44 secured to the bottom surface 12B of the center sill plate 12A. The central section is so supported in these brackets as to extend horizontally in the plane of the longitudinal axis of the cars.

The end section 41 merges at a 90° angle with an end of the central section and is horizontally disposed transverse of the car to which it is also connected by a rubber bushed bracket 45, which together with the adjacent bracket 44, substantially fastens it to the body against all relative movement.

As shown in Figs. 3 to 5, the end section 42 merges at an angle of 90° with the end of the central section opposite the end to which end section 41 is joined. This end section 42, however, depends vertically from the central section and is slidably received in a bushing 46 centrally mounted in the upper surface of the bolster 20, section 42 being thus slidably connected to the latter.

Figure 6:
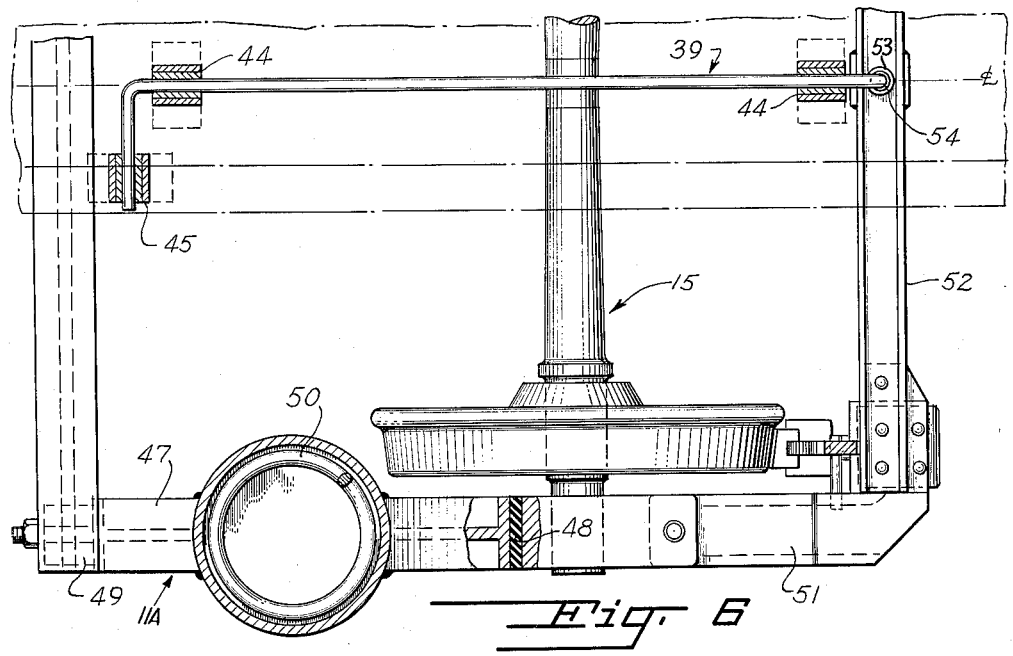
Fig. 6 is a fragmentary top plan view, partly in section, of a portion of a truck and a centering device illustrating another form of the invention.
Figure 7:
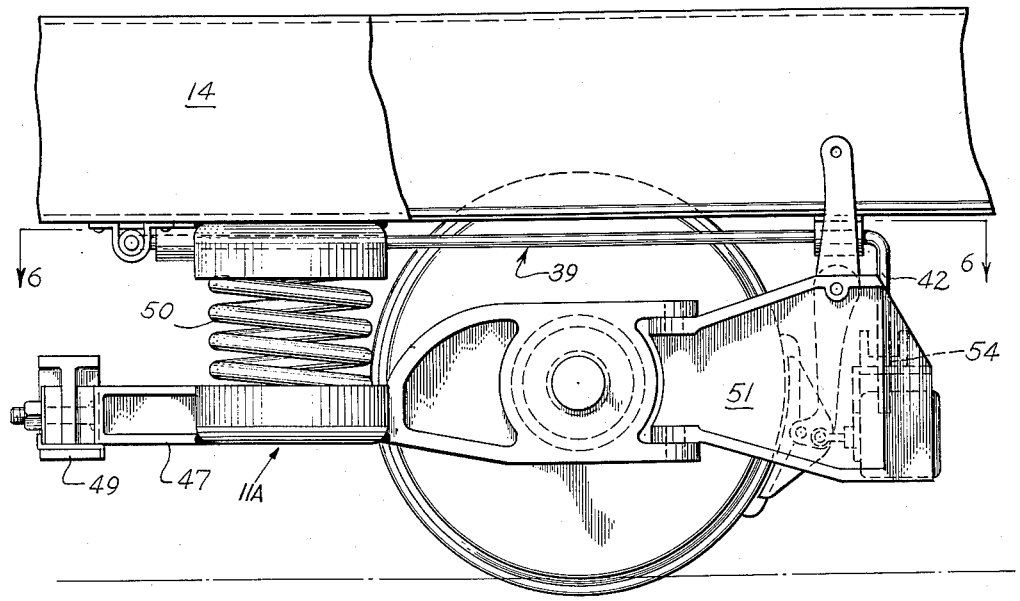
Fig. 7 is a side elevational view of that form of the invention illustrated in Fig. 6.

The embodiment of the invention illustrated in Figs. 6 and 7 shows a truck 11A, all the parts of which are unsprung, and which comprises a wheel and axle assembly 15, a longitudinally extending, horizontal link member 47 journalled at an end thereof on the axle outboard of each wheel. This journal allows limited rocking of the link members 47 on the axle due to a rubber sleeve 48 disposed between the journal bearing and the link member, as shown in Fig. 6. The other end of the link members 47 are bolted through rubber bushings to a body cross piece, 49, and helical springs 50 are disposed between the link members 47 and the body side sills, each of which is provided with suitable spring cups for the purpose.

The ends of the link members 47 opposite the cross piece 49 are formed into clevis joints by which they are pinned to an end of links 51 which are each connected, at their other end, to a transverse end piece 52 of truck 11A. This end piece 52 is provided with a central aperture 53 in which is located the rubber bushing 54.

The same centering device 39 as has heretofore been described is used with this truck, and it is similarly supported by brackets 44 and 45 from the car underframe, and the vertical end section 42 is slidably received in the bushing 53 in the aperture 54 of the end piece 52, being thus slidably connected thereto.

In operation, it will be seen that in either of the forms of truck illustrated and described herein, some relative lateral movement is permitted between the truck and the body. This is due to the helical springs as well as the rubber bushings at the connections between the levers 16 and the links 27 and 27, and between the links 26 and 27 and the cross member 29 and the bracket 31, respectively, in the form shown in Figs. 2 to 5. In the form shown in Figs. 6 and 7 relative lateral movement between the body and the truck is permitted by the springs 50 and the sleeves 48, as well as the rubber bushed connection between the links 47 and the cross piece 49.

As such relative lateral movement occurs, as a result of track curvature or various rail conditions, the centering device 39, having its end section 41 anchored against substantial movement relative to the body, will have its central section 40 wound up by the lateral force imparted to the end section 42 which serves as a crank arm to torque the central section. The centering device, due to its rigidity, will resist such relative lateral movement, and, because of its inherent resilience, will return the body and truck to their normal relative positions when the displacing force abates.

As has been stated heretofore, some of the known centering devices have not been able to compensate for varying load conditions and do not function satisfactorily at all load conditions.

As the load increases and the body supporting springs are compressed, less of a torquing or cranking arm is required for centering in order to keep that function smooth and to avoid over-correction and oscillation. In this connection, it will be seen that as the body is loaded, and the body supporting springs compress, the vertical end section 42 of the centering device slides downwardly in the bushing 46 or 54, as the case may be. Since this end section serves as a moment arm or crank arm, it will be seen that its effective length is shortened as the body load is increased (Fig. 5), and is extended as the body load is decreased (Fig. 4), so that the lateral forces due to relative lateral movement between the body and the truck are transferred to torquing forces in the centering device of a magnitude proportional to the effective length of the end section 42 as well as to the body load.

In other words, as the load is varied, the effective length of the crank or moment arm is varied inversely whereby the effective torquing effort required for centering is delivered more nearly uniformly regardless of load than in previous torsion rod centering devices.

For instance, if a torsion bar 39 be selected which will give a comfortable ride with a loaded car, and if this invention is not embodied in the vehicle, a maximum possible lateral movement of the body relative to the truck will transmit to the central portion 40 of the bar a force $x$ equal to $m$, the mass of the car and load times $L$, the effective length of the crank arm 42.

Now suppose the car to be empty, and to be subject to the same lateral acceleration as above. The mass of the car alone will be $(m-y)$ where $y$ is the weight of the load. This smaller mass acting on the same bar through the same effective length of crank arm cannot twist the bar sufficiently. Therefore less lateral motion between car and truck is possible and the ride is stiffer and less comfortable, and damages the car body. Therefore in conventional torsion bar centering devices, the bar 39 selected must give an ideal ride under average conditions of load and for all other conditions the performance will not be ideal.

However, by this invention the forces acting to twist the bar become $(m-y)(L+z)$ where $z$ represents the increase in effective length of the crank arm 42, due to the removal of the load from the car. The empty car is thereby enabled either to approach or duplicate the ideal conditions of maximum easy lateral motion of the full car by exerting on the portion 40 a force $x_1$ approximating the force $x$ which produces the comfortable ride at full load. The force $x_1$ will be less than the force $x$ because the lateral travel of the car body being equal and the effective length of arm 42 being greater, the portion 40 of torsion bar 39 will have been twisted through a lesser angle.

The above advantage of the invention may be said to arise from the construction in which a car body resiliently suspended directly or indirectly from a wheel and axle assembly and having limited freedom of vertical and lateral movement relative thereto, is centered relative thereto by means of a torsion bar mounted on the undersurface of the body longitudinally thereof and having a vertically downwardly extending crank arm slidably received in a member connected to the wheel and axle assembly and having much less freedom both of vertical and lateral movement relative thereto than the body has. The crank arm is thereby rotated by relative lateral movement of the body and the effective length of the crank arm is shortened as the body is lowered by loading and increased as the body rises relative to the wheel and axle assembly when the load is decreased.

From the foregoing description it will be seen that the present invention provides a vehicle having an economical, simple and reliable centering device which automatically compensates for varying body loads so that relative displacement between body and truck is resisted and positively corrected by a uniform effort regardless of load conditions.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. In a rail vehicle comprising a truck and a car body resiliently supported on said truck and having limited freedom of vertical and lateral movement relative to said truck, the improvement constituted by a device for centering said car body relative to said truck, said device comprising a torsion rod having a central section rotatably supported and secured against lateral movement on an undersurface of said body and extending longitudinally thereof, said torsion rod at one of its ends being rigidly secured to said body and at its other end having a substantially vertically downwardly extending crank arm, said truck having a framing member substantially rigidly positioned with respect to said truck and formed with a vertically oriented aperture and said vertically downwardly extending crank arm being slidably received in said vertically oriented aperture, said crank arm loading said torsion rod upon lateral movement of said body relative to said truck, and the effective length of said crank arm being decreased by downward vertical movement of said body relative to said truck and increased by upward vertical movement of said body relative to said truck whereby increasing and decreasing the load of said car body decreases and increases, respectively, the effective length of said crank arm.

2. In a rail vehicle comprising a car body and a truck which includes a wheel and axle assembly, said car body being resiliently supported on said truck so as to have limited freedom both of vertical and lateral movement relative to said wheel and axle assembly, and said truck having a member much more limited in movement relative to said wheel and axle assembly than said car body, the improvement which comprises a centering device in the form of a torsion rod having a central section rotatably supported and secured against lateral movement on an undersurface of said car body and extending longitudinally thereof, one end of said rod being rigidly secured to said car body and the other end extending vertically downwardly and constituting a crank arm, said member of said truck being formed with a vertically oriented aperture and said vertically downwardly extending crank arm being slidably received in said vertically oriented aperture and the effective length of said crank arm being decreased by the lowering of said body relative to said wheel and axle assembly and increased by the rising of said body relative to said wheel and axle assembly whereby increasing and decreasing the load of said car body decreases and increases respectively, the effective length of said crank arm.

3. Centering device for a rail vehicle having a car body and means resiliently supporting said body from a wheel and axle assembly so that said body has limited freedom of vertical and lateral movement relative to said wheel and axle assembly, said centering device including a torsion rod having a central section rotatably supported and secured against lateral movement on an undersurface of said car body and extending longitudinally of said body, one end of said torsion rod being rigidly secured to said car body and the other end extending substantially vertically downwardly therefrom and constituting a crank arm, said device further comprising a member connected to said wheel and axle assembly and having less freedom both of vertical and lateral movement relative thereto than said body has, said member being formed with a vertically oriented aperture and said vertically downwardly extending crank arm being slidably received in said vertically oriented aperture, whereby upon lateral movement of said body relative to said wheel and axle assembly said torsion rod is loaded, and whereby the effective length of said crank arm is decreased as said body is lowered relative to said wheel and axle assembly when said car is loaded and increased as said body rises relative to said wheel and axle assembly when said car is unloaded.

References Cited in the file of this patent

UNITED STATES PATENTS

| | | |
|---|---|---|
| 998,519 | Huntley | July 18, 1911 |
| 2,080,180 | Messier | May 11, 1937 |
| 2,127,518 | Huntman | Aug. 23, 1938 |
| 2,210,241 | Hickman | Aug. 6, 1940 |
| 2,244,502 | Piron | June 3, 1941 |
| 2,299,576 | Hallquist | Oct. 20, 1942 |
| 2,557,354 | Kivell | June 19, 1951 |
| 2,746,502 | Tomas | May 22, 1956 |

FOREIGN PATENTS

| | | |
|---|---|---|
| 83,981 | Sweden | July 30, 1935 |
| 264,180 | Switzerland | Jan. 3, 1950 |